US010970356B2

(12) United States Patent
Sweeney et al.

(10) Patent No.: US 10,970,356 B2
(45) Date of Patent: Apr. 6, 2021

(54) AUTONOMOUS AND DYNAMIC GENERATION OF A LIVING WEBSITE FOR CONTINUOUS USER ENGAGEMENT

(71) Applicant: Popmenu, LLC, Woodstock, GA (US)

(72) Inventors: Brendan Edward Sweeney, Woodstock, GA (US); Justis Simeon Blasco, Roswell, GA (US); Michael James Gullo, Atlanta, GA (US); Ty William Fairclough, Dunmow (GB)

(73) Assignee: Popmenu, LLC, Woodstock, GA (US)

( * ) Notice: Subject to any disclaimer, the term of this patent is extended or adjusted under 35 U.S.C. 154(b) by 256 days.

(21) Appl. No.: 15/925,563

(22) Filed: Mar. 19, 2018

(65) Prior Publication Data

US 2019/0286756 A1 Sep. 19, 2019

(51) Int. Cl.
*G06F 16/957* (2019.01)
*H04L 29/08* (2006.01)
*G06F 16/9537* (2019.01)
*G06F 40/16* (2020.01)

(52) U.S. Cl.
CPC ...... *G06F 16/9577* (2019.01); *G06F 16/9537* (2019.01); *G06F 40/16* (2020.01); *H04L 67/22* (2013.01)

(58) Field of Classification Search
CPC .. G06F 16/9577; G06F 16/9537; G06F 40/16; G06F 3/0482; G06F 16/9535; G06F 40/103; G06F 16/958; H04L 67/22; H04L 67/306; H04L 67/02; G06Q 50/12; G06Q 30/02; G06Q 30/0641; G06Q 20/12; G06Q 30/0269

USPC .............. 709/246; 705/7.29, 7.32, 7.33, 14.1
See application file for complete search history.

(56) References Cited

U.S. PATENT DOCUMENTS

| | | | | |
|---|---|---|---|---|
| 6,618,062 | B1 * | 9/2003 | Brown | G06Q 30/06 715/810 |
| 7,953,873 | B1 * | 5/2011 | Madurzak | G06Q 30/02 709/229 |
| 8,521,715 | B1 * | 8/2013 | Fearnow | G06F 16/9535 707/707 |
| 9,378,517 | B2 * | 6/2016 | Franosch | G06F 16/3322 |
| 10,762,546 | B1 * | 9/2020 | Justin | G06Q 50/12 |
| 2004/0069313 | A1 * | 4/2004 | DeLaquil | G06Q 10/10 705/15 |

(Continued)

*Primary Examiner* — Caroline H Jahnige
(74) *Attorney, Agent, or Firm* — Ansari Katiraei LLP; Arman Katiraei; Sadiq Ansari

(57) ABSTRACT

A living website is provided that autonomously and dynamically changes presentation based on engagement from users, business members, distributed devices, and, optionally, individual user preferences. The living website presentation changes with the promotion and demotion of website elements through repositioning, visual differentiation, and other means. These changes are produced by a machine rewriting of the living website code that is conditioned on the continually tracked engagement. In particular, the tracked engagement identifies the website elements that are most engaging at that time. The living website then adapts in order to presents users with this most engaging content in a manner that is immediately apparent and before them. Consequently, users spend less time searching, scrolling, or otherwise browsing a website in order to find content that is engaging and of interest to them, and more time interacting with the engaging content that is already before them.

19 Claims, 10 Drawing Sheets

(56) References Cited

U.S. PATENT DOCUMENTS

| | | | | |
|---|---|---|---|---|
| 2004/0177004 | A1* | 9/2004 | Mueller | G06Q 50/12 705/15 |
| 2006/0218043 | A1* | 9/2006 | Rosenzweig | G06Q 30/0603 705/15 |
| 2011/0288911 | A1* | 11/2011 | Barnes, Jr. | G06F 3/04847 705/14.1 |
| 2012/0233002 | A1* | 9/2012 | Abujbara | G06Q 10/06 705/15 |
| 2013/0067348 | A1* | 3/2013 | Kast | G06F 16/95 715/747 |
| 2013/0166401 | A1* | 6/2013 | Algozer | G06Q 30/06 705/16 |
| 2013/0211814 | A1* | 8/2013 | Derks | G06Q 50/12 704/2 |
| 2013/0268887 | A1* | 10/2013 | Roussos | G06Q 30/0241 715/810 |
| 2014/0208202 | A1* | 7/2014 | Ellis | G06F 3/0481 715/238 |
| 2014/0222512 | A1* | 8/2014 | Pace | G06Q 30/0203 705/7.32 |
| 2014/0310651 | A1* | 10/2014 | Padgett | G06F 3/0482 715/810 |
| 2015/0007289 | A1* | 1/2015 | Godse | G06F 21/31 726/7 |
| 2015/0082173 | A1* | 3/2015 | El-Saban | G06F 16/7867 715/719 |
| 2015/0199777 | A1* | 7/2015 | Rodriguez | G06Q 50/12 705/15 |
| 2015/0287080 | A1* | 10/2015 | Geetha | G06Q 30/0256 705/14.54 |
| 2015/0379651 | A1* | 12/2015 | Hurst | G06Q 30/0633 705/15 |
| 2016/0012513 | A1* | 1/2016 | Martinez | G06Q 30/0631 705/15 |
| 2016/0063473 | A1* | 3/2016 | Lee | G06Q 10/06 705/15 |
| 2018/0033026 | A1* | 2/2018 | Sprague | G06Q 30/0201 |
| 2018/0308155 | A1* | 10/2018 | Kohli | G06Q 30/0631 |

* cited by examiner

AUTONOMOUS AND DYNAMIC GENERATION OF A LIVING WEBSITE FOR CONTINUOUS USER ENGAGEMENT

BACKGROUND ART

Review websites can have a significant impact on a business. A sufficient number of negative reviews or ratings can persuade potential customers to go elsewhere. A sufficient number of positive reviews or ratings can persuade new customers to give the business a try or persuade customers deciding between two or more businesses to try the business with the most positive reviews or ratings.

Due to the importance that individuals place on the experiences of others, review websites have become the defacto website for many businesses. This is especially true for review websites that aggregate various information (e.g., hours of operations, contact information, addressing, menus, pricing, etc.) with the reviews and ratings of individuals. In other words, potential customers may visit the review website instead of or in addition to the business's own website, and lean more heavily on the information from the review website than the business's own website when deciding whether to visit or transact with the business.

There are however several shortcomings with these review websites. False and inaccurate information can be posted with no verification. Reviews and ratings persist and follow the business regardless of whether or not the business has changed for the better or worse. Reviews and ratings have equal effects on a business regardless of whether a review or rating focuses on an insignificant, inconsequential, or temporary aspect of the business as opposed to the primary focus or permanent fixture of the business. For instance, a first reviewer may post a negative review because the reviewer disliked the parking in nearby streets around a restaurant on a particular day, while a second reviewer may post a positive review that the food from the restaurant was exquisite. Review websites treat these two posts equally. Consequently, the two posts can have equal affect on the business unless a reader takes the time to dissent the text of each individual post. These and other issues arise with nearly every review website because the content is not curated or verified. The content is simply aggregated in one place regardless of its focus and relevance, and the business has little to not control over what others publish as factual information about the business.

Accordingly, there is a need to more effectively engage consumers and businesses, and provide a single portal whereby accurate information from both parties is presented and is curated according to the provided information. In other words, there is a need to replace the simple aggregation and sequential add-on of every review and rating approach of review websites with a dynamically generated website that continually changes based on timely, relevant, and accurate information contributions from consumers and the business, whereby the presentation of the dynamically generated website can be further customized according to individual customer preferences or offerings of the specific business. There is a further a need to spur engagement of customers and businesses and for the dynamic website generation to occur non-intrusively. To this end, there is a need to incorporate distributed devices from which objective and accurate information can be used to supplement the posts of individuals or to verify the accuracy and content of those posts.

DETAILED DESCRIPTION

Figure 1:
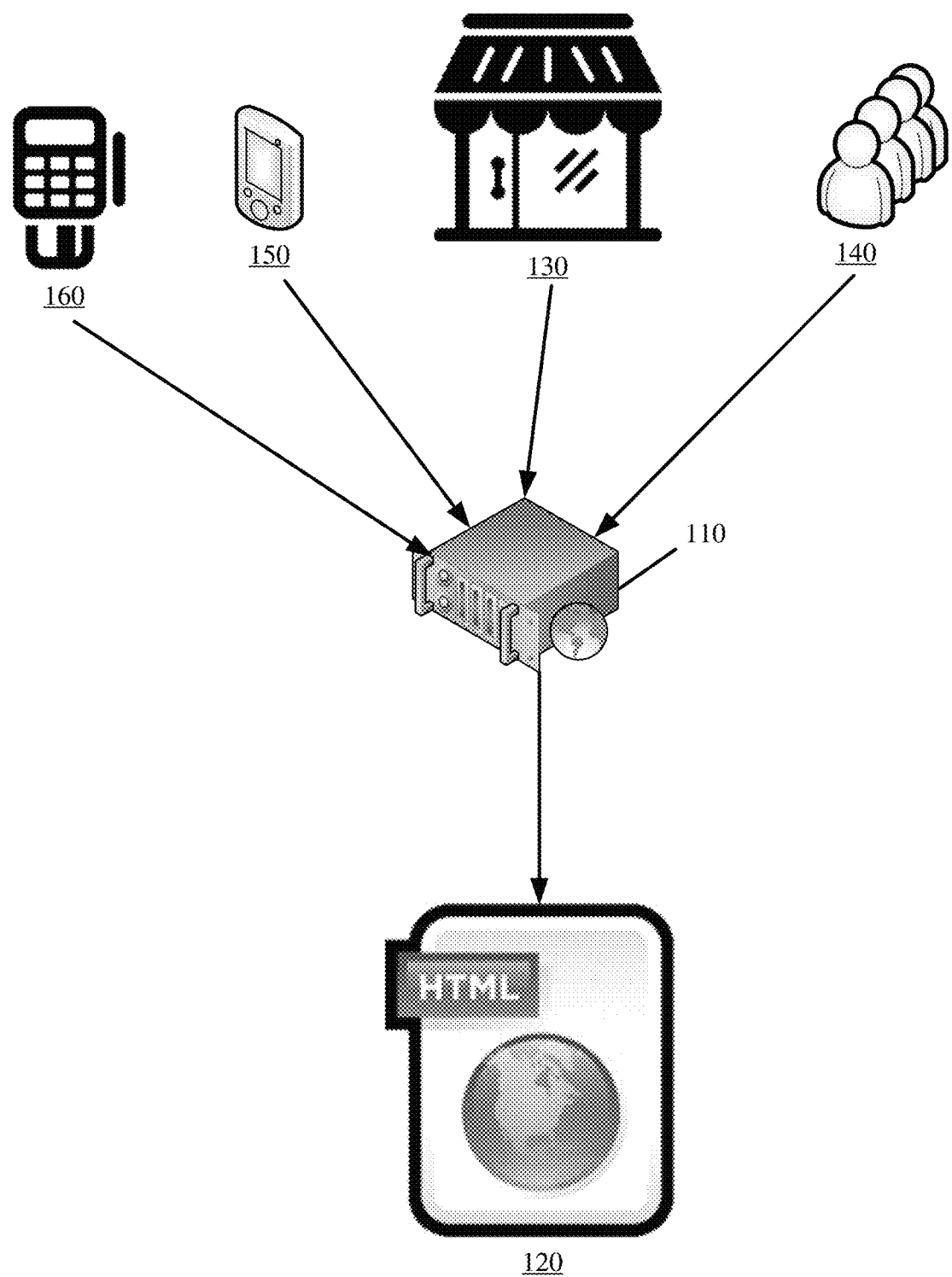
FIG. 1 conceptually illustrates the various input sources feeding the autonomous dynamic website generation that brings about the living website of some embodiments.

This disclosure pertains to a living website. The living website keeps users engaged by autonomously and dynamically changing its content, layout, and presentation such that subsequent requests for the same website can result in different renderings or presentations of the living website. The living website represents digital content that is presented on digital devices. The living website can be a website that is presented via a browser application. The living website can also be displayed directly within an application other than a browser application. For example, the living website may be content presented through an application of a specific business or a consumer application from which to access the living websites of different businesses.

The changes and customizations to the living website are based on engagement from external sources and, optionally, individual user preferences. The living website adapts to active engagement including input that is directly contributed by individuals and business members. The living website also adapts to passive engagement including user interactions with the living website that does not result in an active contribution (e.g., time spent on the site, selection of different links, etc.) or user interactions with the business represented by the living website. The passive engagement stems from input produced from tracking or monitoring user interactions with the living website as well as input produced by distributed devices without human intervention or human involvement. The living website can also be autonomously and dynamically adapted for each user based on user preferences and tracked engagements each user has with the living website and other dynamically generated websites for other businesses.

These embodiments break from traditional website creation and browsing by providing a living website that is autonomously and dynamically generated as opposed to static or human administered websites of the prior art. In particular, the living website continuously changes its own code, website elements, presentation, look, format, and content autonomously through a machine rewriting of the code. The machine rewriting of the code is conditioned and triggered based on the active and passive engagement obtained from each of the above described distinct input sources (e.g., business members, users, and external distributed devices). The living website is also alive in the sense that the machine rewriting of the code does not involve a simple appending of new content to the website. Instead, the machine rewriting of the code uses the active and passive engagement as a basis with which new and existing content are verified, culled, repositioned, and curated.

The living website can be generated and adapted without a central authority controlling its code base. The living website drives user engagement and retains users at the website by offering different presentations of the same website to different visitors, with each presentation highlighting the website elements and corresponding content that is most engaging at that time. Some embodiments further modify the presentation of the same website for different visitors such that each presentation presents the website elements and corresponding content that is most engaging for the individual visitor based on prior engagements of that visitor. The living website also drives user engagement and retains users at the website by allowing them to contribute their own content to the website of a business and have the business website take shape according to the engagements of the user and other users.

These dynamic presentations break from traditional web browsing. In particular, the dynamic presentations increase user engagement by eliminating time spent by users in searching, scrolling, or otherwise browsing a website in order to find content that is engaging and of interest to them. The living website is dynamically generated upon each request to visually differentiate and promote the desired content in such a manner that it is immediately apparent and before the user. The irrelevant content can be obscured or even removed from the website before presentation to the user. In other words, rather than present a generic website to a user, the living website attempts to read the user's mind and desires before generating the website presentation. In doing so, users spend less time aimlessly trying to find engaging content and are less likely to navigate to a different site because they did not find the content they wanted in a given amount of time. Consequently, users spend more time, on average, on a living website of some embodiments than other websites of the prior art. Users visit fewer websites because more engaging content is in one place on the living website. Replacing the time spent in searching, scrolling, and browsing prior art websites with time spent engaging with website elements of the living website also translates into more business and revenue, increased customer retention and loyalty, and increased website traffic to the living website. In turn, this translates into increased customers for the underlying business.

FIG. 1 conceptually illustrates the various input sources feeding the autonomous dynamic website generation that brings about the living website of some embodiments. The figure illustrates the living website generation system 110.

The living website generation system 110 autonomously and dynamically generates the living website 120 for a particular business 130. Although a single business is shown, the system 110 can autonomously and dynamically generate multiple living websites for multiple different businesses or entities.

In some embodiments, modifications are made to Domain Name System (DNS) servers such that requests directed to the particular business 130 living website 120 or domain are aliased, resolved, or otherwise forwarded to the system 110. In some other embodiments, the system 110 hosts the domain or Uniform Resource Locator (URL) at which the living website 120 of the particular business 120 is accessed.

The system 110 autonomously and dynamically generates the living website 120 based on inputs from the particular business 130, and also inputs from users 140 and a set of distributed devices 150. The users 140 include visitors to the living website 120 and customers of the particular business 130. The input from the set of distributed devices 150 is generated and passed to the system 110 without human intervention or involvement. In FIG. 1, the distributed devices include mobile devices 150 of the users 140 and point of sale devices 160 of the particular business 130. Although not shown, additional or other distributed devices can also provide input to the living website generation system 110.

Figure 9:
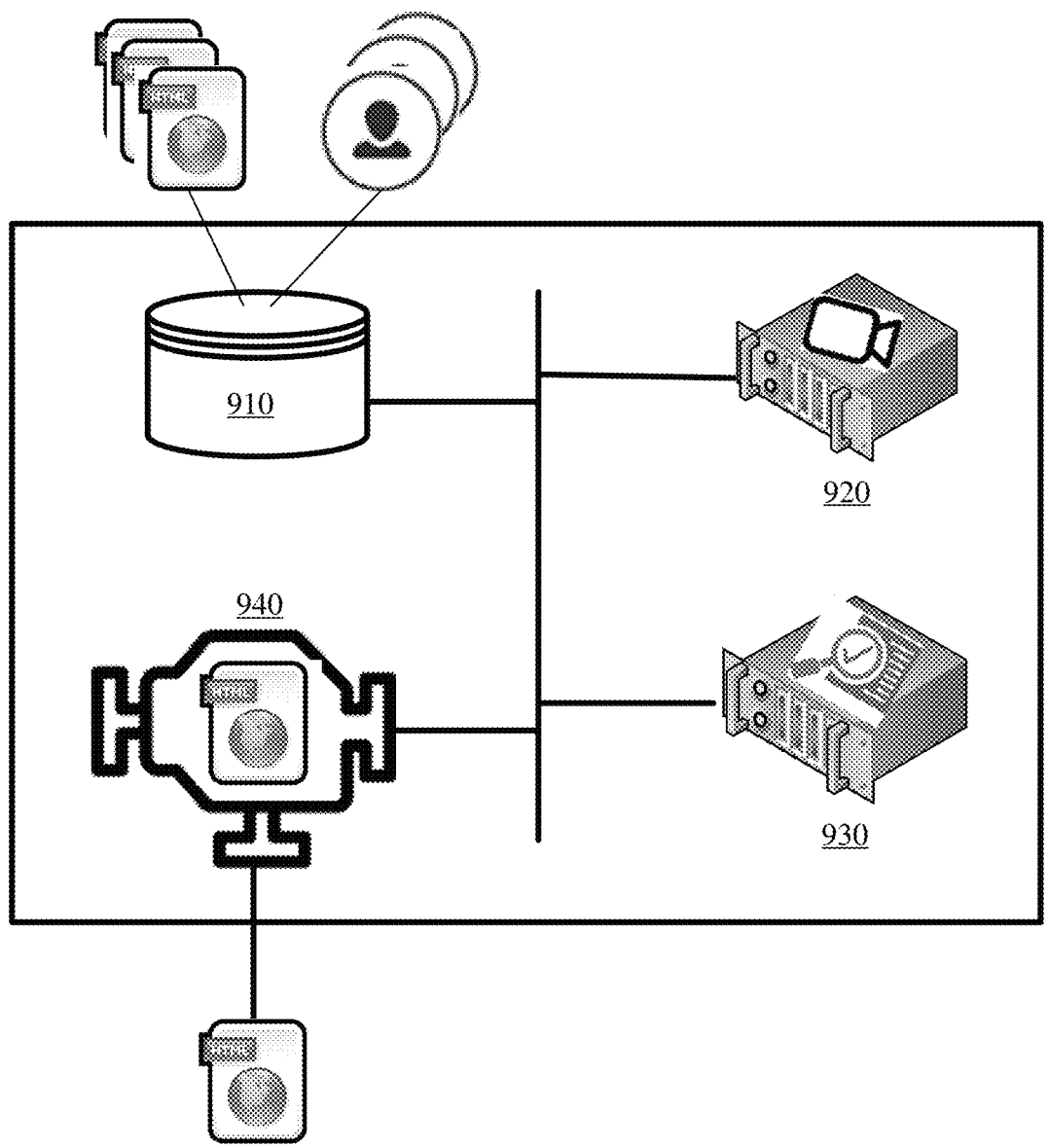
FIG. 9 illustrates exemplary components of the living website generation system.

The living website generation system 110 executes on one or more network enabled machines. The machines autonomously generate the code from which the living website 120 of the particular business 130 and websites of other businesses are rendered based on the continuous feed of input from the input sources 130, 140, 150, and 160 and other input sources not enumerated in FIG. 1. The machines also continuously rewrite and modify the living website 120 code based on the continuous input feed. FIG. 9 below enumerates some components of the living website generation system 110 in greater detail.

Each living website 120 has several website elements. The website elements of a particular living website can be partitioned into different sections and managed separately in their respective sections. The website elements can also be hierarchically arranged such that a sequence of website element selections traverse the hierarchy to arrive at a particular website element that is embedded down in the hierarchy. Each website element is one or more of text, a selectable link, an image, an application, video, audio, or other website content. Each website element represents or conveys information about a business or offerings of the business. Each website element is defined as HypterText Markup Language (HTML) code in preferred embodiments. For instance, a website element with a selectable link and an image can have "<a href= . . . >" and "<img src= . . . >" HTML tags. In some embodiments, the website elements can be further comprised of scripts in one or more scripting languages, Cascading Style Sheets (CSS), applications, and function calls, as some examples. The system 110 also serves the living website to requesting devices, servers, or users over a digital network, such as the Internet, using standard networking protocols including Internet Protocol (IP), Transmission Control Protocol (TCP), and HyperText Transfer Protocol (HTTP).

In some embodiments, the business 130 registers with the living website generation system 110 in order to have the system 110 autonomously and dynamically generate the living website 120 for that business 130. The initial input from the business 130 can include a template for an initial layout of website elements. In the case of the business 130 operating as a restaurant, the initial input could include a menu of dishes and pricing for each dish. The living website generation system 110 then grows and evolves the website from the initial input, template, or layout based on engagement from the users 140 and distributed devices 150 and 160. In particular, the living website generation system 110 autonomously rewrites the website code based on the engagement and/or additional input from the particular business 130 serving to verify the accuracy and relevance of the engagement input or provide first-hand information about changes to the business offerings.

User 140 engagement can include the submission of reviews, ratings, and images about offerings of business 130 as presented through the website elements of the living website 120. User 140 engagement can also include performing a set of actions (e.g., liking, sharing, interested in, etc.) on the website elements. Users 140 submit these inputs to the system 110 using a network enabled device such as a mobile phone, tablet, or computer.

In some embodiments, the users 140 register with the engine 110 before submitting the input. The registration creates a user profile from which the input can be submitted. The user profile is also used to track the engagement of a corresponding user when the user visits any of the living websites generated by the system 110. In particular, the system 110 tracks website elements selected or viewed by the user, the amount of time the user spends viewing different website elements, number of visits by the user to a living website, etc. In some embodiments, the system 110 uses the tracked engagement from the user profile to customize the generation of the living website 120 on an individualized basis.

The generation of living website 120 is also based on the input from the distributed devices 150 and 160. The distributed devices 150 and 160 input is not manually generated or submitted by a user. Rather, this is input that is produced from an electronic sensor or from functional execution of the distributed devices 150 and 160. For instance, geolocation input can be obtained from a Global Positioning System (GPS) sensor of the user mobile devices 150. The geolocation input identifies when a user enters a business. This geolocation input can then serve as input with which the system 110 can verify other input about the business that is submitted by the mobile device user (e.g., reviews or ratings targeting the business or its offerings). The point of sale devices 160 provide input regarding purchases made by different users from different businesses. This input can again be used to verify other user submitted input (e.g., reviews or ratings about particular business offerings) or can be used as input with which to modify the living website and promote popular business offerings.

Figure 2:
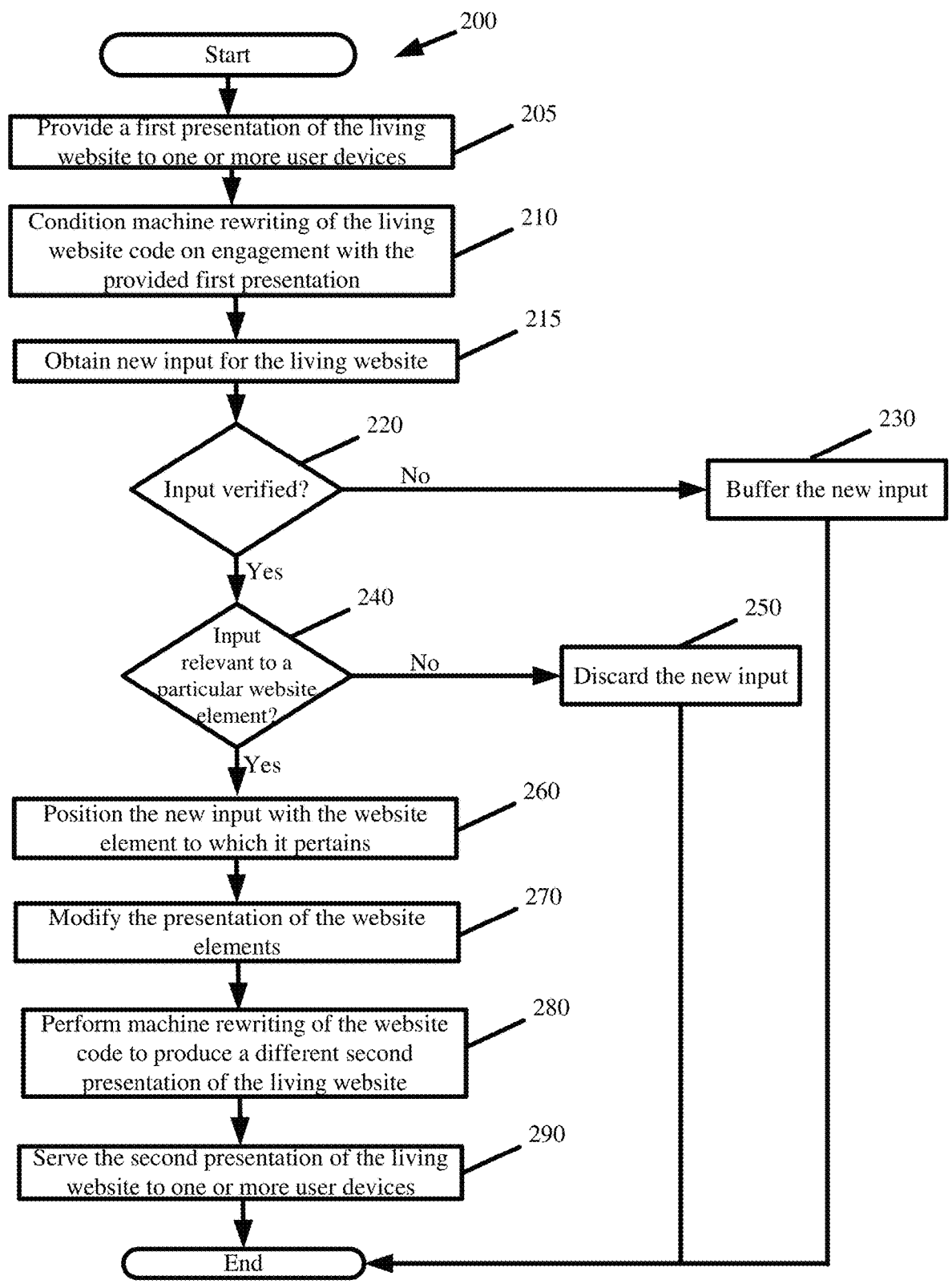
FIG. 2 presents a process for dynamic generation of the living website based on human and non-human input sources in accordance with some embodiments.

FIG. 2 presents a process 200 for dynamic generation of the living website based on human and non-human input sources in accordance with some embodiments. Process 200 is performed by the living website generation system identified in FIG. 1 above.

The process 200 commences by providing (at 205) a first presentation of the living website to one or more user devices in response to requests for the living website. The process conditions (at 210) the machine rewriting of the living website code (e.g., changing from the first presentation to a different second presentation) on tracked engagement with the first presentation of the living website.

The process tracks engagement in the form of new input that is obtained (at 215). As noted above, the new input can be obtained from different individuals that engage with the particular website. This can include contributions from the business personnel and users that are customers or potential customers of the business. Users can submit reviews, ratings, images, or perform different actions with respect to existing content on the particular website. For example, users can tag a website element that represents a dish from a restaurant with the tag expressing the user's interest in that dish, sharing the dish with another individual, saving the dish for later viewing, scoring the dish, or engaging in some other manner. Similarly, the business personnel can provide content in the form of new entries for the website, new images, new descriptions, new promotions, etc. The new input can also be obtained without human intervention or involvement from the distributed devices.

The process determines (at 220) the verification status of the new input. The new input can be verified with or without human intervention. For example, if a user submits an image of a restaurant dish, the image can be sent to a member of the restaurant who can then confirm that the image is submitted for the correct dish and accurately conveys the presentation of the dish by the restaurant. Verification without human intervention involves using existing content or input from the distributed devices to verify the new content obtained at step 215. For example, if a user submits a review of a restaurant dish, the system confirms that the user was at the restaurant based on geolocation tracking of the user's mobile device. The system can alternatively or additional confirm that the user ordered the dish, thereby verifying authenticity and accuracy of the review, based on integration of sales information from the business's point of sale devices. In some embodiments, the verification step is optional or performed with respect to specific types of input or input that is manually submitted by users.

The process retains (at 230) without presentation new input that cannot be or is not yet verified. Alternatively, the process may discard or obscurely present new input that cannot be or is not yet verified, wherein the obscure presentation may include positioning the new input underneath or away from other verified input.

The process adds input that is verified to the website presentation. To add the input to the website presentation, the process determines (at 240) whether the new input is relevant or pertains to a website element of the living website. In some embodiments, the determination is based on the website element under which the input is submitted. For instance, a rating or favorite action is tied to a particular website element within the presentation of the living website. In some other embodiments, the determination is based on keyword analysis. For instance, the new input may be a review directed to the music played in a restaurant, but the website provides a menu for items served by the restaurant. The relevance of the review is therefore unrelated to any of the website elements. In response to determining that the new input has no relevance to any of the website elements, the process discards (at 250) the input or retains it for custom insertion by the business. The new input has relevance when the subject or target of the content is an existing element within the website. For example, the new input is relevant when it is a review directed to a particular dish from a restaurant menu that is presented on the website. The process dynamically adds the new input in response to determining that the input is relevant.

Dynamically adding the input involves positioning (at 260) the new input with the website element to which it pertains. The positioning further involves determining where to locate the new input relative to existing input or content associated with the same website element. The location is based on the engagement value of the new input.

The engagement value can be based on several factors including temporal and contextual relevance. For example, recent reviews, reviews accompanied with images, or reviews liked by others may be positioned first under the website element with other lesser engaging content (e.g., older reviews, reviews without images, or reviews that liked by others) positioned underneath. Verification can also factor into the positioning of the new input, with verified input being positioned before unverified input.

The process then modifies (at 270) the presentation of the website elements. This includes promoting, demoting, visually differentiating, or removing website elements. The changes to the website element presentation are based on the engagement levels of the website elements as determined from the input or engagement that is associated with each website element. Certain website elements may become more popular than others based on the input or engagement from the different input sources. For instance, a first restaurant dish represented by a first website element may receive few or no reviews, whereas a second restaurant dish represented by a different second website element may receive several positive reviews. In this case, the process determines that the second restaurant dish is more popular and promotes the second restaurant dish by moving the second website element ahead of the first website element in the website presentation. Such repositioning improves user engagement with the website by providing users quick and direct identification of the most relevant content, and by providing the business with analytical insight that extends beyond just number of sales (e.g., which elements/dishes are most viewed). Other means with which to promote website elements include adding tags or visually differentiating website elements from one another.

The first presentation of the living website provided at step 215 has changed a result of positioning the new input and modifying the presentation of the website elements. Accordingly, the condition for machine rewriting the living website code has been triggered and the process performs (at 280) a machine rewriting of the website code to produce a different second presentation of the living website. The second presentation incorporates the changes from the steps above. In particular, the code for the relevant website site is rewritten or modified to include the new input along with existing input according to the positioning at 260. The code is also rewritten to reflect any changes to the promotion, repositioning, or reformatting of the website elements resulting from the modifying at 270. The second presentation of the living website is then served (at 290) in response to subsequent requests from one or more user devices.

Some embodiments base the dynamic positioning of the received input and the modified presentation of the website elements on scores assigned to the received inputs. Each input is scored to reflect its engagement value. The score is based on the verification status of the input, contextual relevance, and temporal relevance as some factors. The score can change over time as these factors change.

Some embodiments determine contextual relevance based on the presence or absence of certain features. For instance, a review that is strictly text based is scored less than a review having text and an image, because visitors are more likely to engage with the review having text and an image than the review that is strictly text based. Similarly, a review that is descriptive and expressive is scored greater than a concise review that generally mentions a business offering. Sentiment analysis may be used for scoring the contextual relevance of different input.

Temporal relevance scores more recently received input greater than input from months or years in the past. The accounting of the temporal relevance allows the living website to change with the business over time. Thus, unlike review sites of the prior art in which an initial set of negative reviews stick with the business forever, the temporal relevance deprioritizes such reviews over time.

Other input is scored based on the associated event or action. For instance, the input action of selecting a restaurant dish as a "favorite" is scored higher than the input action of saving a dish to try.

In addition to scoring active user engagement (i.e., the input that is contributed directly by users), the living website generation system also tracks and scores passive engagements. A passive engagement is trackable activity without a user created submission. The time users spend viewing a specific website element or the number of times different website elements are selected are examples of passive user engagement that the system tracks. Each such passive engagement can be scored in a similar fashion as the active user engagements, and can be used by the living website in the autonomous and dynamic changing of the website code and presentation. For instance, a first website element has a higher passive engagement score than a second website element when the first website element is selected (e.g., clicked on) twice as much as the second website element.

Passive engagement also includes input obtained from the distributed devices. In particular, integration with point of sale devices of a business provide the living website generation system with real-time information as to the popularity and purchase rate of different offerings of the business that are represented by different website elements of the living site. In this case of website elements representing restaurant dishes, the passive engagement score of each website element can be based in part on the number of times each corresponding dish is ordered or purchased as identified from the business point of sale device input feed. The website elements for the most frequently ordered dishes can then be promoted or visually differentiated in subsequent presentation of the living website based on their passive engagement scores. This passive engagement can also be categorized. For example, the point of sale device input feed indicates which restaurant dishes have been ordered the most. The living website generation system can categorize the order information based on appetizers, entrees, and desserts. The living website generation system can then promote the most popular dishes in each category. For instance, the most ordered appetizers, entrees, and desserts can be presented first in their respective sections of the living website.

Figure 3:
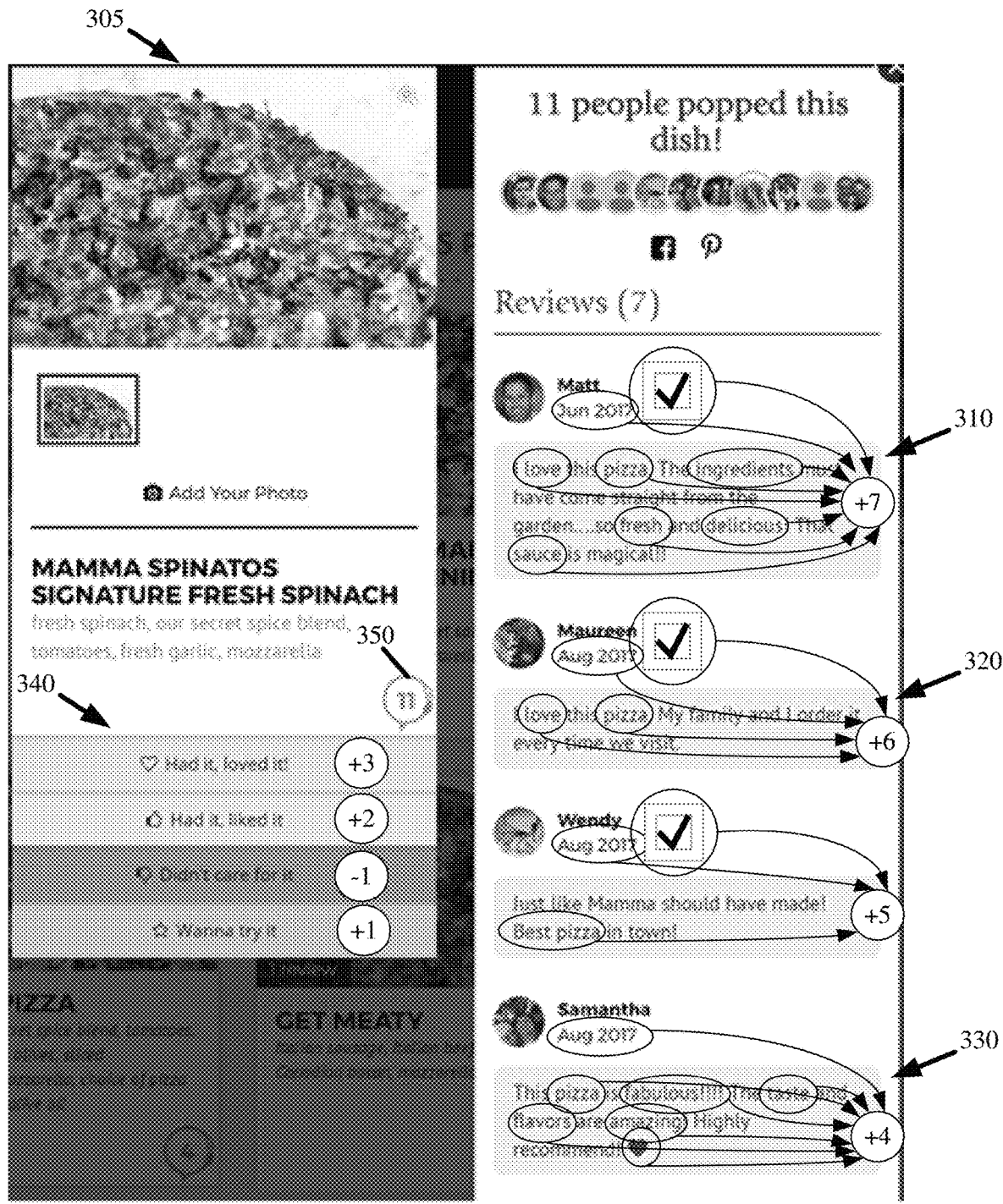
FIG. 3 conceptually illustrates dynamic placement of different input for a particular website element of a living website in accordance with some embodiments.

FIG. 3 conceptually illustrates dynamic placement of different input for a particular website element of a living website in accordance with some embodiments. The figure conceptually illustrates different inputs that are associated with the particular website element 305 as a result of tracked engagement. Each input is scored and the scores are presented for explanatory purposes.

The living website continually changes its presentation of the inputs under the particular website element 305 so that the inputs with the highest scores are presented first for increased visibility and user engagement. In this figure, the first review 310 that is presented is older than the second review 320. However, the first review 310 is determined to drive more user engagement and therefore have a higher engagement value than the second review 320 because of the expressive and descriptive language of the review 310 relative to the second review 320 and other reviews. Moreover, the second review 320 is assigned a higher score than a third review 330, because the second review 320 has been verified to come from a user that visited the business or purchased the referenced dish, whereas the third review 330 has not been verified but is more expressive and descriptive than the second review 320. The engagement value of the reviews could be increased further if accompanied with an image.

Other inputs or types of engagement with the particular website element 305 may be displayed and scored separately. FIG. 3 conceptually illustrates the different scores or different engagement values of a set of predefined engagement actions 340 for the particular website element 305. If a user invokes or selects one of the set of predefined engagement actions 340 for the particular website element, the action is recorded and associated with the particular website element as indicated by reference marker 350. Moreover, the score for the invoked action is added to the aggregate score representing the total engagement value of the particular website element 305.

It is worth reiterating that, in some embodiments, the dynamic placement of the tracked input for the particular website element 305 is performed autonomously and continuously without human intervention. Once again, this breaks from traditional website creation whereby a human subjectively orders content or a machine sequentially adds content as the content is received regardless of its engagement value as determined from contextual relevance, temporal relevance, verification status, and other factors.

The autonomous and dynamic generation of the living website involves rearranging inputs under each website element as shown in FIG. 3 above, and also reformatting the layout, position and look of the website elements themselves. These changes to the living website elements are also based on the assigned engagement scores.

In some embodiments, the engagement score for a particular website element is the sum of the engagement scores of the engagements associated with that particular website element. In other words, the more positive engagement that is tracked for a particular website element, the greater the engagement value of that particular website element.

The website elements with the greatest aggregate engagement scores are the website elements that users most commonly interact with or engage with, and thereby represent the most popular business offerings. To increase engagement with the living website, the website elements with the highest aggregate scores are repositioned or reformatted so that the most engaging content and most sought-after information are easily found in the presentation of the living website.

Figure 4:
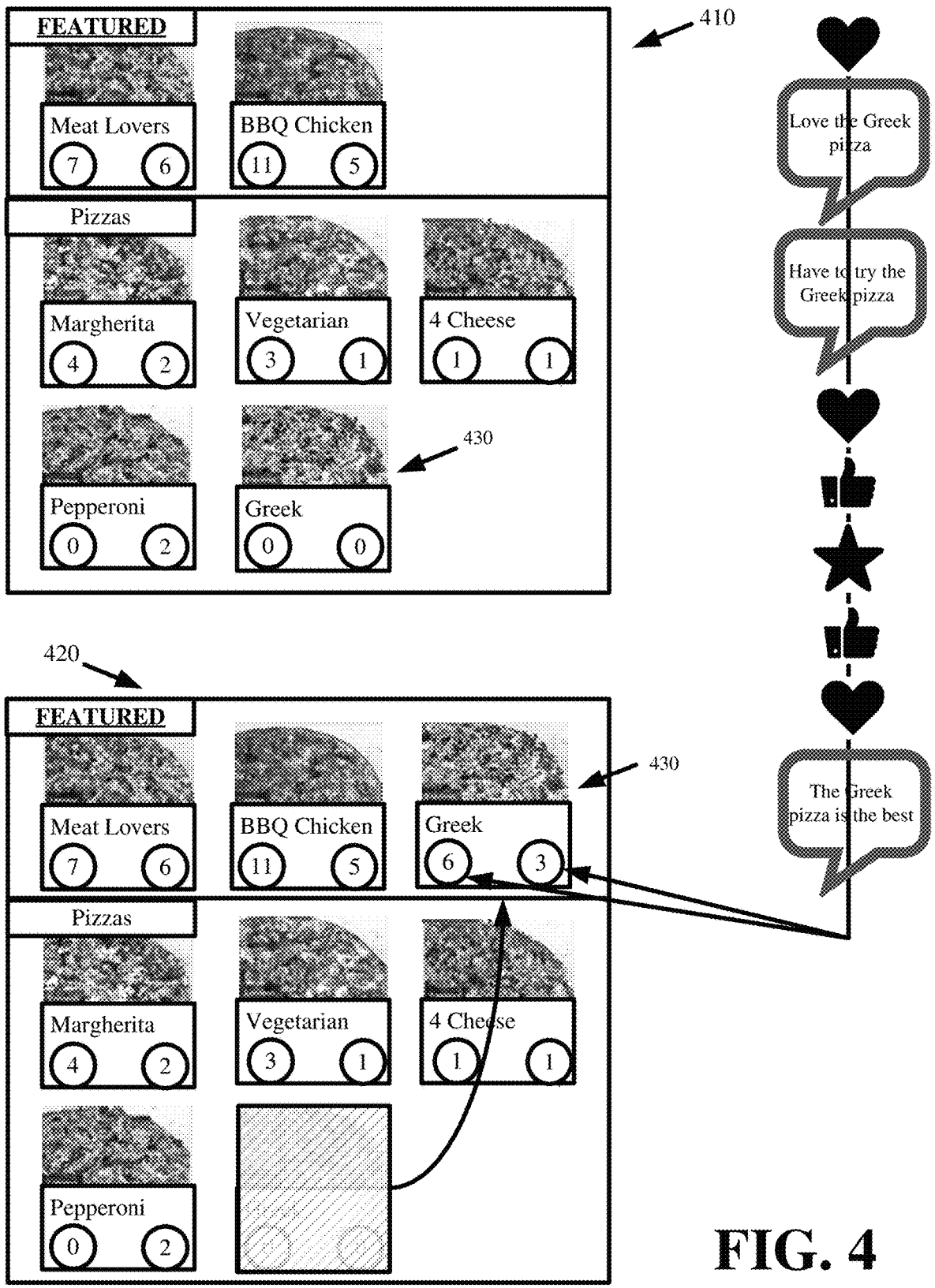
FIG. 4 conceptually illustrates a living website modifying itself, and more specifically, its presentation of website elements in accordance with the autonomous and dynamic generation of the living website.

FIG. 4 conceptually illustrates a living website modifying itself, and more specifically, its presentation of website elements in accordance with the autonomous and dynamic generation of the living website. The figure illustrates a first presentation 410 or rendering for the website elements of the living website and a subsequent second presentation 420 or rendering for the website elements of the living website. The different presentations 410 and 420 illustrate how the living website reconfigures its code and the presentation of its website elements based on tracked engagement with those elements. In this figure, the website elements are representative of different restaurant dishes from a restaurant menu. Each website element is displayed with encircled numbers representing the tracked engagement for that website element or the corresponding dish at the time of the living website presentation.

A particular website element 430 representative of a particular restaurant dish is provided an obscure position in the first presentation 410 of the living website. The positioning of the particular website element 430 within the first presentation 410 can be due to an initial template or positioning that is configured by the restaurant, the particular restaurant dish being a new dish, or a lack of tracked engagement with the particular website element 430.

Between the first presentation 410 and the second presentation 420, there is a significant amount of tracked engagement with the particular website element 430. This can include active engagement based on user submission of positive reviews and ratings for the particular website element 430 as well as likes, favoriting, sharing, and other positive attributable actions directed to the particular website element 430. This can also include passive engagement based on tracking an increase in the number of times the particular website element 430 is selected (e.g., clicked on) relative to other website elements of the living website, or tracking an increase in the time users spends viewing the particular website element 430 and the input associated with particular website element 430 (e.g., reviews, ratings, likes, images, etc.) relative to other website elements of the living website.

Each such engagement (e.g., active or passive) adds to or increases the score of the particular website element 430 relative to the other website elements. The increased score may additionally or alternatively be in response to increased sales volume for that dish as determined from distributed devices, such as point of sale devices of the restaurant or payment processing devices. The increased score indicates that the particular restaurant dish is or has recently become a favorite or popular dish among the restaurant's patrons.

In response to this increased engagement and the increased score, the living website autonomously reconfigures itself to produce the second presentation 420 in which the particular website element 430 is repositioned to the top of the living website in a featured section. The second presentation 420 is produced as a result of the generation system rewriting the living website code to embed the tracked engagement as part of the particular website element 430 and also to reposition the particular website element 430.

Figure 5:
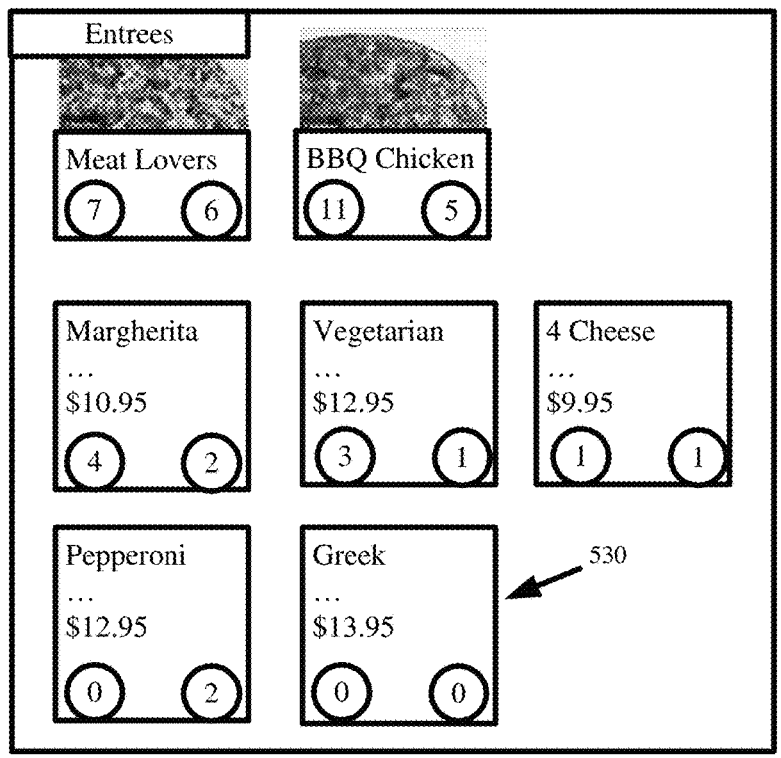
FIG. 5 conceptually illustrates the living website reconfiguring with visual differentiation of a web site element with high engagement value in accordance with some embodiments.
Figure 5:
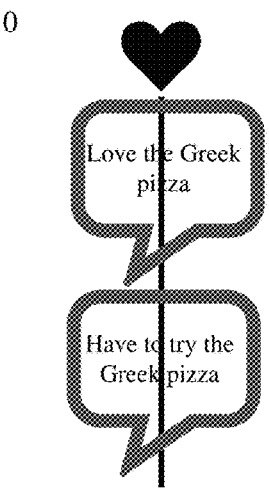
Figure 5:
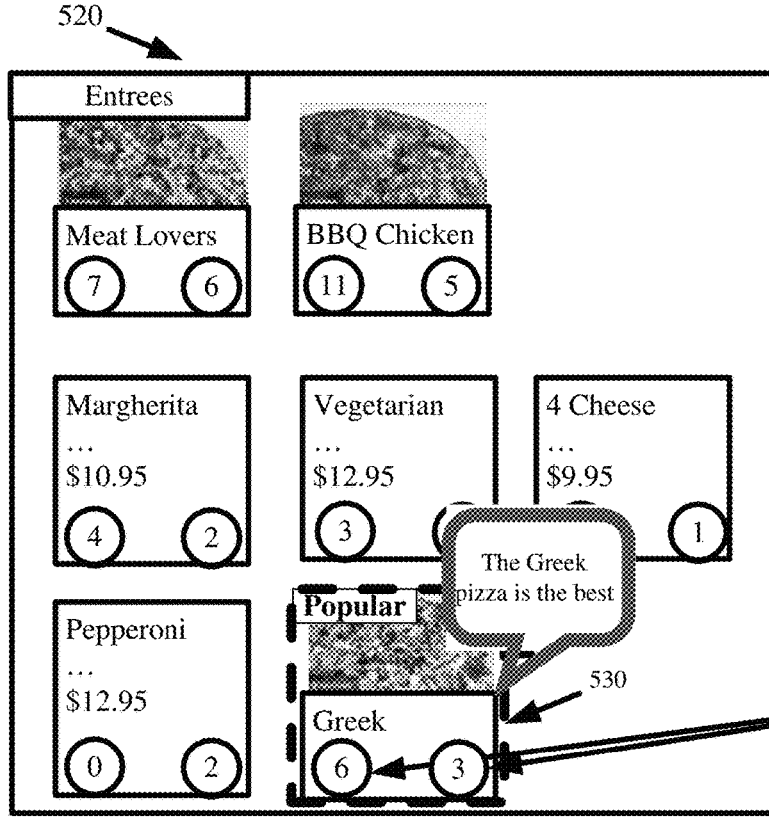
Figure 5:
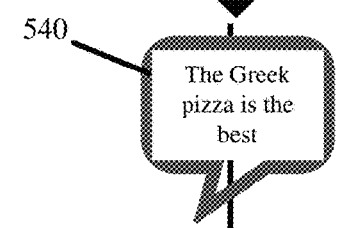
Figure 5:

FIG. 5 conceptually illustrates the living website reconfiguring with visual differentiation of a web site element with high engagement value in accordance with some embodiments. FIG. 5 illustrates a first presentation 510 of the living website. The system generates and provides the first presentation 510 in response to a first request for the living website. The first presentation 510 includes images for two of the website elements and textual descriptions for the other website elements.

After generating and sending the first presentation 510, a particular website element 530 receives input and engagement that increases the aggregate score for the particular website element 530 relative to other website elements. The increased score is indicative of users engaging more with the particular website element 530 than other elements. To retain and increase the engagement, the living website changes from the first presentation 510 to the second presentation 520 so that the particular website element 530 is visually differentiated from the other elements.

The second presentation 520 differentiates and draws engagement to the particular website element 530 by tagging or highlighting the particular website element 530. The second presentation 520 also expands and overlays a review 540 that is determined to have significant engagement value rather than embed that review under the particular website element 530 until the particular website element 530 is selected. Finally, the second presentation 520 adds a user submitted image 550 to the particular website element 530, wherein the first presentation 510 did not include an image with the particular website element 530.

The second presentation 520 is dynamically generated and provided in response to a subsequent second request for the living website. Here again, the changes to the living website are based on tracked engagement with the tracked engagement conditioning the machine rewriting of the living website without human modification of the code.

In some embodiments, the living website further customizes its code and presentation on an individual requestor basis. In some such embodiments, different user variants of the living website are autonomously and dynamically generated from a continuously changing root instance of the living website. The living website autonomously and dynamically incorporates individualized customizations for a specific user based on prior engagements by that specific user.

Prior engagements of users are tracked to user profiles stored at the living website generation system. In some embodiments, users create the profiles to facilitate the input submission or to opt in for the living website individualized customizations. Users can link their mobile devices to a created user profile in order for the system to track various engagements originating from the mobile devices. In some embodiments, users submit inputs to different living website through a consumer application that is installed on the user device. The consumer application updates the user profile based on various active and passive engagements the user has with different sites.

The system tracks each engagement a user has with the living websites of different businesses to the corresponding user profile. This includes tracking active and passive engagements, wherein active engagements include reviews, ratings, images, liking, sharing, and other user created submissions, and wherein passive engagements include trackable activity without a user created submission to a website or website element (e.g., website element selections by a user, number of visits to a website, user viewing time of a website or website element, etc.).

The user profiles are also populated with user engagements that are tracked by the distributed devices. For instance, geolocation of the user's mobile phone provides passive engagement information as to the number of times the user visits a business. Point of sale devices also provide engagement information as to the business offerings that the user purchases.

Figure 6:
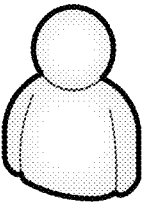
FIG. 6 conceptually illustrates a user profile for customizing the autonomous and dynamic generation of the living website in accordance with some embodiments.

FIG. 6 conceptually illustrates a user profile for customizing the autonomous and dynamic generation of the living website in accordance with some embodiments. The user profile 610 tracks different active and passive engagements the user has had with different website elements of various living websites. This includes passive engagements including living website visits 620 and time spent viewing specific website elements 630. This further includes passive engagement tracked from a geolocation sensor 640 of the user's mobile device and purchase history 650 from various point of sale devices that are integrated as part of the living website generation system. The user profile 610 also tracks active engagements including review submissions 660, image submissions 680, and invocation of various preset actions 690.

From the user profile, the system can determine individual user preferences and customize the presentation of the living websites for individual users based on their user preferences. For example, the system may determine a particular user's preference for pasta dishes based the user profile of that particular user tracking a high number of likes for pasta dishes, a high number of selections for website elements representing pasta dishes, a large amount of time spent viewing website elements representing pasta dishes, geolocation information indicating frequent visits to Italian restaurants, and purchase history directed to pasta dishes. In response to this user preference, the system can customize the presentation of a particular restaurant living website in order to promote or highlight website elements representing pasta dishes while demoting, obscuring, or hiding other website elements.

Figure 7:
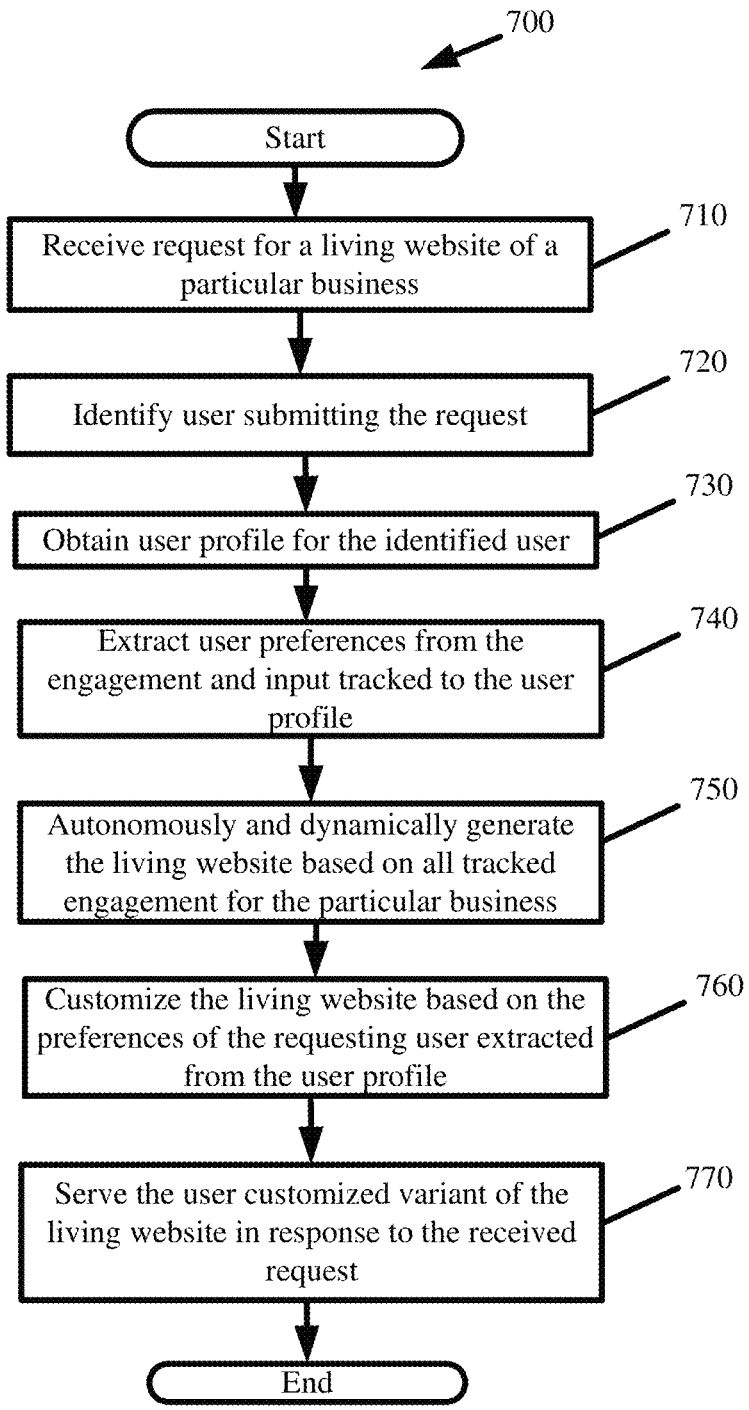
FIG. 7 presents a process by which the living website autonomously and dynamically customizes its code and presentation for an individual user based on a user profile in accordance with some embodiments.

FIG. 7 presents a process 700 by which the living website autonomously and dynamically customizes its code and presentation for an individual user based on a user profile in accordance with some embodiments. The process commences in response to the system receiving (at 710) a request for a living website of a particular business.

The process identifies (at 720) the user submitting the request. The user identification can be based on an Internet Protocol (IP) or other addressing of the user, a cookie or token accompanying the request, or login credentials accompanying the request.

The process obtains (at 730) a user profile for the identified user. Once again, the user profile tracks various active and passive engagements the user has had with different websites. This again includes reviews and ratings the user has submitted for different website elements of the different websites, time spent viewing different website elements, geolocation information identifying businesses visited by the user, and point of sale device information identifying user purchases. For the purposes of this figure, it is assumed that the user profile contains user submitted input that positively identifies spicy restaurant dishes the user has enjoyed at various restaurants.

The process extracts (at 740) user preferences from the engagement and input tracked to the obtained user profile. The user preferences can be extracted from metadata or tags that are associated with the user input or from conducting sentiment analysis of the user input. Continuing from the example above, the user preferences reveal that the user enjoys spicy dishes.

The process autonomously and dynamically generates (at 750) the living website of the particular business by rewriting the website code according to all tracked input and engagement for the particular business. In particular, the process dynamically generates the website based on the input and engagement the living website receives from others.

The process then customizes (at 760) the living website based on the preferences of the requesting user as determined from the user profile obtained at 730. The customizations involve identifying website elements that match to the user preferences. In some embodiments, the website elements are tagged with metadata. The metadata identifies properties, keywords, and other qualities associated with the corresponding website element. Accordingly, the matching can be performed by finding commonality between the preferences from the user profile and the website element metadata. The code for the living website is further modified to promote the matching website elements for easier identification by the user. Once again, this can include repositioning the matching website elements or adding visual differentiation for the matching website elements that did not exist in dynamically generating the website at step 750.

If the user preferences indicate a propensity for spicy dishes, the customizations at 760 include promoting or otherwise visually differentiating the website elements of the living website that represent spicy dishes. The process serves (at 770) the user customized variant of the living website in response to the request received at step 710.

Figure 8:
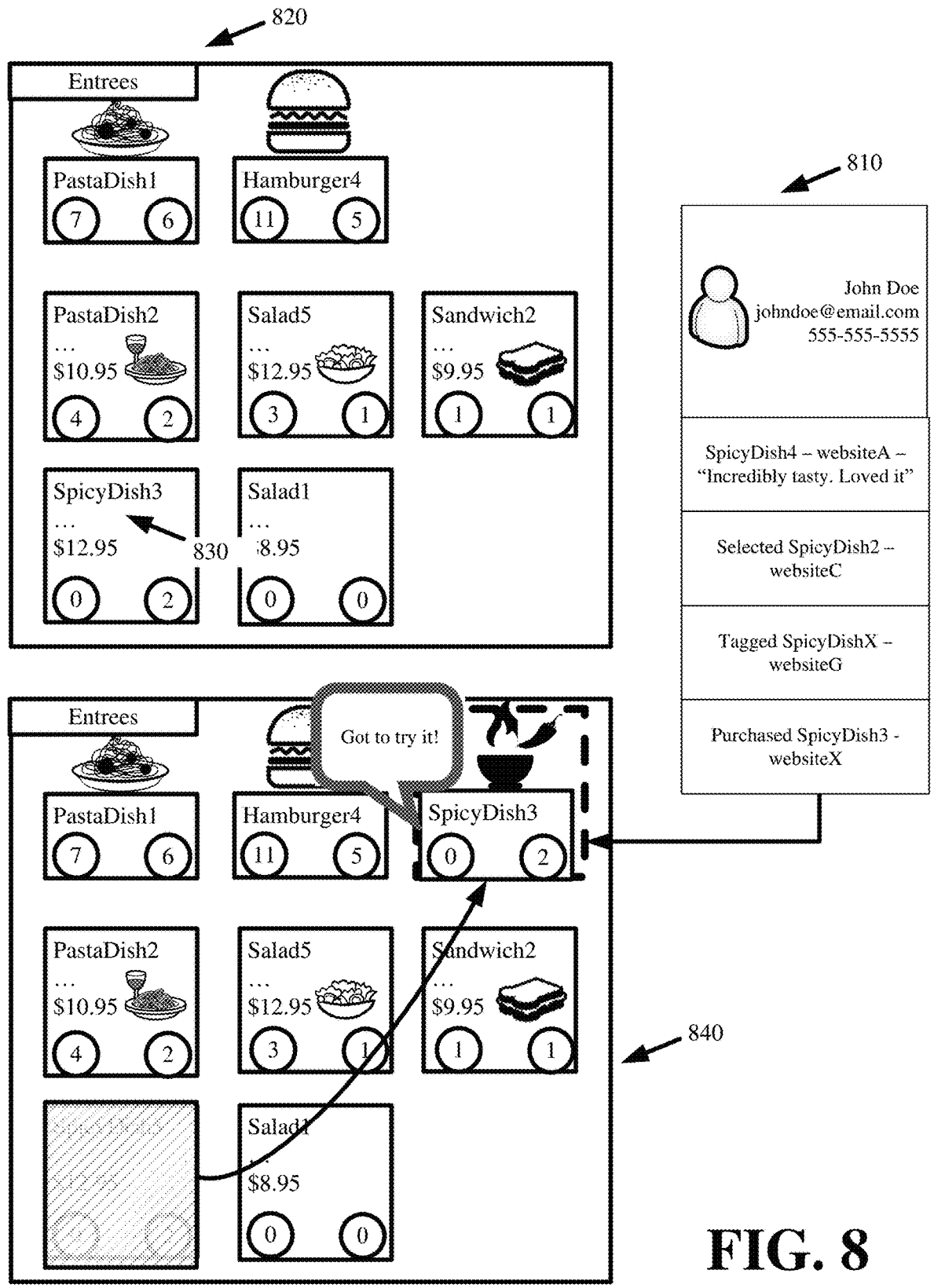
FIG. 8 conceptually illustrates individualized customizations of the living website in accordance with some embodiments.

FIG. 8 conceptually illustrates individualized customizations of the living website in accordance with some embodiments. FIG. 8 illustrates a user profile 810 that is the basis for the individualized customizations to the living website. The user profile 810 is populated with active and passive engagement that identifies the user's preference for spicy dishes. The active engagement includes positive reviews the user submitted for spicy dishes at various restaurants. Other active engagement added to the user profile 810 comes from distributed devices, and specifically, point of sale devices of different restaurants that track the user's purchasing behavior and that reveal a propensity for purchasing spicy dishes. The passive engagement includes greater amounts of time the user spent on website elements for spicy dishes and user clicks on website elements for spicy dishes than website elements for other dishes.

The figure further illustrates a first presentation 820 of the living website. The first presentation 820 promotes the most popular dishes of the restaurant based on all tracked engagement for the website elements. The promoted dishes are presented first with large graphics. Less prominently displayed is website element 830 for a spicy dish with tags matching the user's preferences from the user profile 810.

The matching of the website element 830 to the user preferences from the user profile 810 conditions the machine rewriting of the living website code. In particular, the machine rewriting of the living website code occurs in response to receiving a request for the living website from a machine or user associated with the user profile 810, obtaining the user profile 810 based on the request, and identifying the customizations based on the user preferences from the user profile 810 matching to at least the website element 830. The machine rewriting produces a second presentation 840 of the living website.

As shown in FIG. 8, the second presentation 840 promotes the website element 830 within the living website for easier and more immediate visibility. The website element 830 is also visually differentiated from the other website elements in order to stand out and increase the likelihood of grabbing the user's attention and engagement. The visual differentiators include presenting the website element 830 with an image where the first presentation 820 did not include an image with the website element 830, highlighting the website element 830 to draw focus to that element, adding a spicy icon to present the association to the user's preferences, and presenting a positive review from another user. The second presentation 840 and visual differentiators thereof also allow the user to find the information that he or she is likely most interested in, and readily present the information that the user is most likely to engage with without the user having to scroll, click, or other navigate through the living website.

Additional user customizations can include removing content from the living website when the content is irrelevant or not of interest to a user as determined from the corresponding user profile. For instance, a particular user profile may identify a user to be a vegetarian. This identification can be based on the user actively engaging (e.g., submitting reviews, ratings, images, etc.) only with website elements for vegetarian dishes on different restaurant sites. The identification can also be based on the user profile tracking purchase history of the user and the purchase history including purchases of vegetarian dishes only. In some embodiments, the user can directly identify himself or herself as a vegetarian within the user profile when creating the user profile. In any such case, the living website generation system can customize the presentation of different restaurant living websites for that user, based on the user profile identifying the user as a vegetarian, by removing one or more website elements that are tagged or otherwise associated with meat containing dishes. In doing so, the living website provides the website elements that are of most interest to the user while hiding the other website elements that are of no interest to the user.

In some embodiments, the dynamic website generation customizes the living website by prioritizing business profitability. In some such embodiments, the system receives an input feed from machines or systems of a distributor or goods provider. The input feed identifies the raw goods or materials purchased by the business as well the cost for each unit. The living website identifies the final goods sold by the business. The elements of the living website are tagged with the different raw goods or materials and quantities with which the final goods are made. From these inputs, the system computes the cost to make each final good and compares the cost to the sales price. The system can then promote or prioritize the final goods with the highest profitability and dynamically change the promotions as costs for the raw goods and materials fluctuate.

For example, some embodiments communicably couple the system to a feed from a distributor such as Sysco or US Foods. The feed provides a digital account of the goods purchased by a restaurant or business whose living website is generated by the system. More specifically, the feed identifiers the per unit price of each good. The living website identifies the different restaurant dishes. Each dish is represented by a different website element and each website element is tagged with the quantity of the different ingredients from which the dish is made. Each website element also specifies a price for each dish. Thus, when two website elements have the same or similar engagement or aggregate scores, the system can prioritize the promotion of the website element representing the dish with greater profitability.

The continually changing of the living website does its part to increase and retain user traffic to the living website and the business represented by that living website. Nevertheless, there is still a need to attract users to the living websites apart from the organic or natural attraction that occurs from users looking for information about the businesses represented by the living websites.

In some embodiments, the system leverages the user profiles or a consumer application to dynamically generate content that drives user engagement or user traffic to a living website. The consumer application can be an application installed and running on the user mobile device. The consumer application can be used to access the living websites of different businesses and track active and passive engagement of the user with those living websites. The consumer application can also access sensors of the mobile device for additional passive engagement tracking, including identifying when a user visits a business storefront (based on GPS geolocation tracking) or purchases one or more items from a business (based on mobile payment).

The living website generation system, through the consumer application, can detect when a user visits a storefront of a particular business. The system can then send a prompt or notification to the user through the consumer application requesting the user to submit a review or rating about the particular business with the review or rating being used as active engagement input with which to customize subsequent presentations of the living website for the particular business.

As noted above, the system can determine user preferences from the user profile. Assume that the user profile of a particular user indicates a preference for a particular type of dish. The system can scan the metadata, tags, or website elements of the living websites to identify restaurants that offer that particular type of dish. The system can then present those restaurants or the particular type of dish from those restaurants to the user. The system may restrict the identification to restaurants that the user has engaged with in the past or has otherwise expressed an interest in. The dynamically generated content can be provided to the user as targeted advertising or promotional materials that are emailed or sent as text messages, or content that is presented through the user profile, consumer application, or otherwise presented on other websites.

Some embodiments attract users based on inputs from the distributed devices, and more specifically, geolocation information from user phones and sales receipts from point of sale devices of the businesses. Based on the geolocation information, the system tracks when a user enters a business. At that time or a later time, the system may send a prompt to the user requesting the user share his or her experience with the business by engaging with the living website for that particular business. The prompt can be a text message, email, or alert sent directly to the user mobile device. The prompt can also be a notification that is created in the user profile that is presented to the user when the user next accesses his or her profile or a notification that appears on the consumer application running on the user mobile device.

Engagement can be attracted in a similar fashion in response to feeding data from the business's point of sale devices to the living website generation system of some embodiments. The feed from the point of sale devices can identify a user of a credit card transaction, the business the user transacted with, and optionally items the user purchased. In response to this input feed from the distributed devices of the business, the system can once again provide a prompt to the user and request the user to engage with the dynamically generated website for that particular business. For example, the tracked purchase history identifies a user that prefers pasta dishes. In this case, the system can provide a prompt to notify the user to view a new or popular dish at the living website for the corresponding restaurant.

FIG. 9 illustrates components of the living website generation system of some embodiments. The system includes a datastore 910, an engagement tracker 920, a verification engine 930, and a living website generator 940. The components can be a mix of hardware and software that collectively form a special purposed machine for the autonomously and dynamically generation the living websites.

The datastore 910 is memory or storage to which the latest instance of each living website is stored. The datastore 910 stores all the website elements that comprise a living website as well as the tracked input and engagement that become part of each website element. The datastore 910 is also memory or storage to which user profile information is stored.

The engagement tracker 920 tracks active and passive engagement for the website elements of the different living websites created by the system. The engagement tracker 920 tracks interactions with the living websites and receives user and business member submissions including new content, reviews, ratings, images, and invocation of predefined actions. The engagement tracker 920 also tracks the passive engagements with the living websites including the number of visitors to a living website, selections of different website elements, and amount of time spent by different users on different website elements. The engagement tracker 920 further integrates external distributed devices from which additional engagement is obtained. As noted above, this includes communicably coupling with user mobile devices and leveraging the geolocation or GPS sensor of the devices for physical engagement with businesses. This also includes integrating with point of sale terminals and obtaining engagements in the form of purchasing or transaction data. The engagement tracker 920 also creates and populates the user profiles with engagement tracked from corresponding users.

The verification engine 930 verifies the engagement tracked by the engagement tracker 920. The verification engine 930 verifies the accuracy and relevance of tracked engagement and matches the tracked engagement to a specific website element. The verification of particular engagement can be performed with other tracked engagement, other existing content, or by contacting business members. Once the verification engine 930 associates a tracked engagement to a website element of a particular living website, the tracked engagement is stored in conjunction with that website element in the datastore 910.

The living website generator 940 contains the logic for the autonomous and dynamic generation of the living website according to the embodiments described above. The living website generator 940 conditions the machine writing and rewriting of the living website code on the continually changing engagement tracked by the engagement tracker 920 as well as user preferences based on tracked engagements to user profiles. The living website generator 940 performs the machine writing of the living website code to produce the continually changing presentation of the living websites. The generated living websites are then passed over a data network to requesting users or user machines. The engagement tracker 920, verification engine 930, and living website generator 940 collectively form a special purposed machine for generating the living website in accordance with the above described embodiments.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 10:
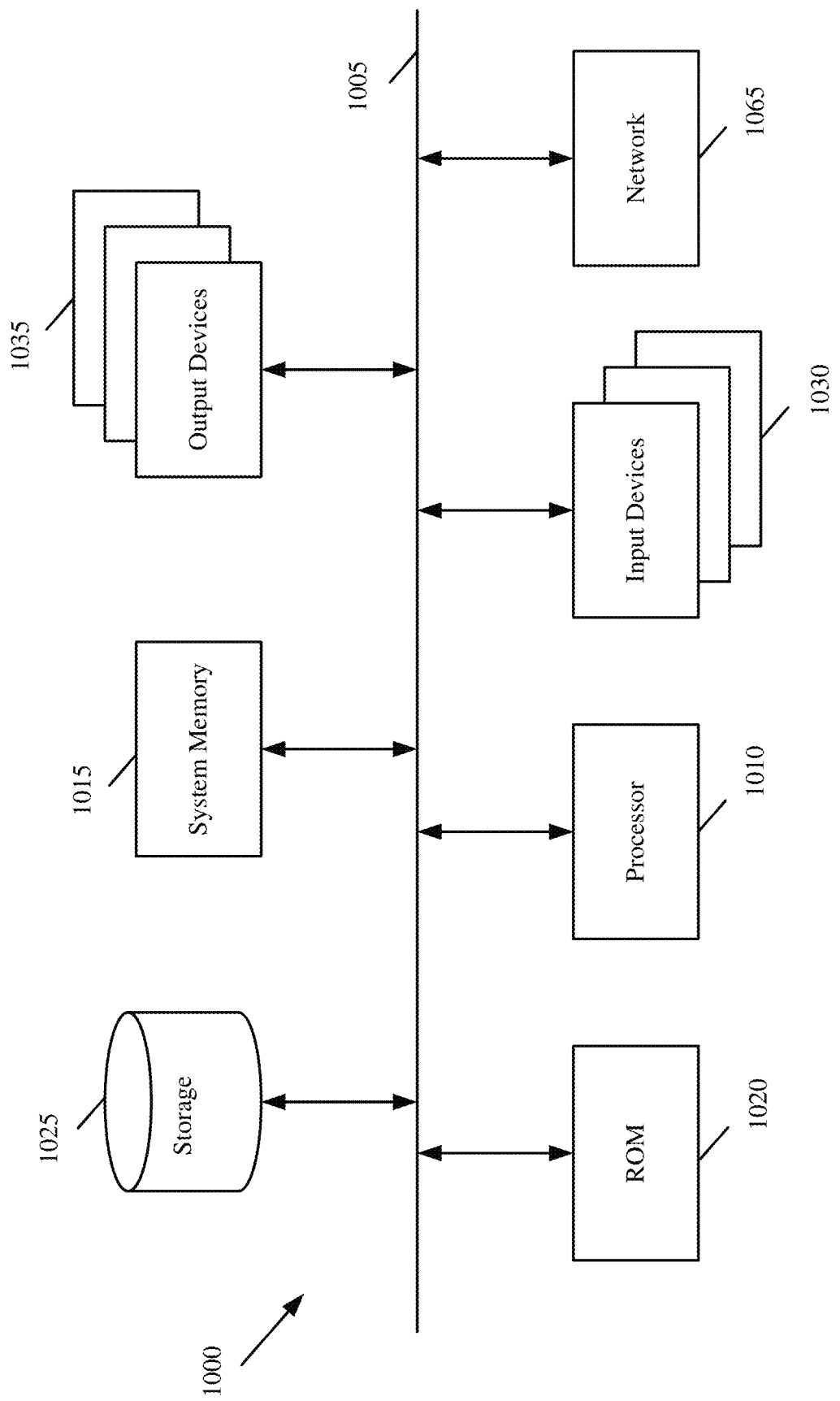
FIG. 10 illustrates a system or server with which some embodiments are implemented.

FIG. 10 illustrates hardware components of the system with which some embodiments are implemented. Such a system includes various types of computer-readable mediums and interfaces for various other types of computer-readable mediums that implement the various methods and machines described above. System 1000 includes a bus 1005, a processor 1010, a system memory 1015, a read-only memory 1020, a permanent storage device 1025, input devices 1030, and output devices 1035.

The bus 1005 collectively represents all system, peripheral, and chipset buses that communicatively connect the numerous internal devices of the system 1000. For instance, the bus 1005 communicatively connects the processor 1010 with the read-only memory 1020, the system memory 1015, and the permanent storage device 1025. From these various memory units, the processor 1010 retrieves instructions to execute and data to process in order to execute the processes of the invention. The processor 1010 is a processing device such as a central processing unit, integrated circuit, graphical processing unit, etc.

The read-only-memory (ROM) 1020 stores static data and instructions that are needed by the processor 1010 and other modules of the system. The permanent storage device 1025, on the other hand, is a read-and-write memory device. This device is a non-volatile memory unit that stores instructions and data even when the system 1000 is off. Some embodiments of the invention use a mass-storage device (such as a magnetic or optical disk and its corresponding disk drive) as the permanent storage device 1025.

Other embodiments use a removable storage device (such as a flash drive) as the permanent storage device Like the permanent storage device 1025, the system memory 1015 is a read-and-write memory device. However, unlike storage device 1025, the system memory is a volatile read-and-write memory, such as random access memory (RAM). The system memory stores some of the instructions and data that the processor needs at runtime. In some embodiments, the processes are stored in the system memory 1015, the permanent storage device 1025, and/or the read-only memory 1020.

The bus 1005 also connects to the input and output devices 1030 and 1035. The input devices enable the user to communicate information and select commands to the system. The input devices 1030 include alphanumeric keypads (including physical keyboards and touchscreen keyboards), pointing devices. The input devices 1030 also include audio input devices (e.g., microphones, MIDI musical instruments, etc.). The output devices 1035 display images generated by the system. The output devices include printers and display devices, such as cathode ray tubes (CRT) or liquid crystal displays (LCD).

Finally, as shown in FIG. 10, bus 1005 also couples computer 1000 to a network 1065 through a network adapter (not shown). In this manner, the computer can be a part of a network of computers (such as a local area network ("LAN"), a wide area network ("WAN"), or an Intranet, or a network of networks, such as the Internet).

As mentioned above, the system 1000 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for autonomously and dynamically generating a dynamic restaurant menu, the method comprising:

providing a first instance of the dynamic restaurant menu as a living website rendered by computer code to a plurality of user devices in response to a first set of requests from the plurality of user devices, the dynamic restaurant menu comprising a plurality of menu items that correspond to a plurality of dishes served at a particular restaurant, and the first instance of the dynamic restaurant menu arranging the plurality of menu items according to a first presentation having a first placement for each of the plurality of menu items;

tracking a first plurality of engagements the plurality of user devices have with different individual menu items of the plurality of menu items in the first presentation in response to providing the first instance of the dynamic restaurant menu, wherein the first plurality of engagements comprise (i) user contributions submitted by the plurality of user devices to the different individual menu items, and (ii) one or more of tracked viewing times, numbers of selections, and recorded sales for the different individual menu items;

tracking a second plurality of engagements between users of the plurality of user devices and different dishes of the plurality of dishes served at the particular restaurant, wherein the second plurality of engagements comprise (i) reviews that mention the different dishes without engagement with corresponding menu items for the different dishes, and (ii) purchases of the different dishes recorded at point-of-sale devices at the particular restaurant;

determining first engagement values based on the tracking of the first plurality of engagements;

determining second engagement values based on the tracking of the second plurality of engagements;

automatically executing machine rewriting of the computer code to generate second computer code in response to a particular menu item having a greater first engagement value than other menu items of the plurality of menu items and a particular dish represented by the particular menu item having a greater second engagement value than other dishes represented by corresponding menu items, wherein said automatically executing comprises defining a different second presentation providing a dynamic second placement of the plurality of menu items in which at least the particular menu item of the plurality of menu items at a bottom of the first presentation is repositioned to a top of the second presentation;

reordering a set of engagements with the particular menu item or the particular dish represented by the particular menu item in the second presentation based on individual engagement values associated with each engagement of the set of engagements with the particular menu item or the particular dish, wherein the individual engagement values are based on varying relevance that each engagement has to the particular menu item or the particular dish; and providing to one or more of the plurality of user devices, a second instance of the dynamic restaurant menu as the living website rendered by the second computer code, wherein the second instance of the dynamic restaurant menu comprises the particular menu item at the top of the second presentation as a result of said rewriting, and with the set of engagements presented with the particular menu item according to said reordering.

2. The method of claim 1 further comprising detecting, based on a sensor of a particular user device from the plurality of user devices, location of the particular user device at the particular restaurant, and increasing the individual engagement value of a user contribution from the particular user device as a result of said detecting.

3. The method of claim 2, wherein increasing the individual engagement value comprises verifying the user contribution from the particular user device in response to said detecting the location of the particular user device at the particular restaurant based on said sensor of the particular user device.

4. The method of claim 1, wherein the user contributions comprise textual reviews, ratings, images, or user invocation of one or more actions associated with one or more of the plurality of menu items.

5. The method of claim 1 further comprising scoring each engagement of the first plurality of engagements and the second plurality of engagements, and defining the individual engagement values based on said scoring.

6. The method of claim 1 wherein automatically executing machine rewriting of the computer code comprises removing one or more of the plurality of menu items appearing in the first presentation from the second presentation in response to the one or more menu items having engagement values that are less than engagement values of other menu items.

7. The method of claim 1 further comprising tracking engagements of a particular user with menu items from one or more of the dynamic restaurant menu and other dynamic restaurant menus and with different dishes of the particular restaurant and other restaurants.

8. The method of claim 7 further comprising creating a user profile based on said tracking engagements of the particular user.

9. The method of claim 7 further comprising receiving a request for the dynamic restaurant menu from a user device associated with the particular user, and providing a third instance of the dynamic restaurant menu with a third presentation of the plurality of menu items in which at least a second menu item, that is different than the particular menu item, is repositioned from the second presentation to the third presentation based on the particular user having more prior engagements with the second menu item than other menu items of the plurality of menu items and with a dish represented by the second menu item than other dishes served at the particular restaurant.

10. The method of claim 1 further comprising increasing the individual engagement value of a first engagement with the particular menu item relative to a second engagement with the particular menu item based on the first engagement receiving more interactions from the plurality of user devices than the second engagement.

11. The method of claim 1 further comprising increasing the individual engagement value of a first engagement with the particular menu item relative to a second engagement with the particular menu item based on the first engagement comprising textual input from a first user device that is supplemented with an image provided by the first user device or another user device of the plurality of user devices and the second engagement excluding textual input or an image.

12. The method of claim 1 further comprising increasing the individual engagement value of a first engagement with the particular menu item relative to a second engagement with the particular menu item based on the first engagement comprising input from a particular user device about the particular menu item and verification of a location of the particular user device at a restaurant serving the particular menu item or verification of a purchase of the particular menu item by a user associated with the particular user device, and the second engagement lacking verification.

13. The method of claim 1 further comprising increasing the individual engagement value of a first engagement with the particular menu item relative to a second engagement with the particular menu item based on the first engagement comprising more expressive and descriptive words about the particular menu item than the second engagement.

14. The method of claim 1 further comprising increasing the individual engagement value of a first engagement with the particular menu item relative to a second engagement with another menu item of the plurality of menu items based on the first engagement comprising a longer viewing time or more user selections than the second engagement.

15. A system for generating a dynamic restaurant menu, the system comprising:
  one or more processors configured to:
    provide, as a living website rendered by computer code, the dynamic restaurant menu with a first presentation having a first placement for each of a plurality of menu items to a plurality of user devices in response to a first set of requests for the dynamic restaurant menu from the plurality of user devices at a first time, wherein each of the plurality of menu items corresponds to a different dish that is served at a particular restaurant;
    track a first plurality of engagements the plurality of user devices have with different individual menu items of the plurality of menu items in response to providing the dynamic restaurant menu with the first presentation, wherein the first plurality of engagements comprise (i) user contributions submitted by the plurality of user devices to the different individual menu items, and (ii) one or more of tracked viewing times, numbers of selections, and recorded sales for the different individual menu items;
    track a second plurality of engagements between users of the plurality of user devices and different dishes served at the particular restaurant, wherein the second plurality of engagements comprise (i) reviews that mention the different dishes without engagement with corresponding menu items for the different dishes, and (ii) purchases of the different dishes recorded at point-of-sale devices at the particular restaurant;
    determine first engagement values based on the tracking of the first plurality of engagements;
    determine second engagement values based on the tracking of the second plurality of engagements;
    automatically execute machine rewriting of the computer code to generate second computer code in response to a particular menu item having a greater first engagement value than other menu items of the plurality of menu items and a particular dish represented by the particular menu item having a greater second engagement value than other dishes represented by corresponding menu items, wherein said automatically executing comprises defining a different second presentation providing a dynamic second placement of the plurality of menu items in which at least the particular menu item of the plurality of menu items at a bottom of the first presentation is repositioned to a top of the second presentation;
    reorder a set of engagements with the particular menu item or a particular dish represented by the particular menu item in the second presentation based on individual engagement values associated with each engagement of the set of engagements with the particular menu item or the particular dish, wherein the individual engagement values are based on varying relevance that each engagement has to the particular menu item or the particular dish; and provide to one or more of the plurality of user devices, the second presentation of the dynamic restaurant menu as the living website rendered by the second computer code, wherein the second presentation of the dynamic restaurant menu comprises the particular menu item at the top of the second presentation as a result of said rewriting, and with the set of engagements presented with the particular menu item according to said reordering.

16. The system of claim 15 further comprising a sensor of a particular user device integrating with the system, wherein said tracking comprises obtaining from said sensor, an image of the particular menu item.

17. The system of claim 15 further comprising a geolocation sensor of a particular user device integrating with the system, wherein the one or more processors are further configured to verify at least one engagement with the geolocation sensor by confirming a location of the particular user device at the particular restaurant.

18. The system of claim 15 further comprising a point-of-sale device integrating with the system, wherein the one or more processors are further configured to verify at least one engagement based on a completed transaction detected by the point-of-sale device.

19. The system of claim 15 further comprising at least one user profile storing previous engagements associated with a user of a particular user device, and wherein said defining comprises changing the first presentation based on said previous engagements from the at least one user profile.

* * * * *